US008660543B2

(12) United States Patent
Turner et al.

(10) Patent No.: US 8,660,543 B2
(45) Date of Patent: Feb. 25, 2014

(54) CALL MANAGEMENT SYSTEM

(75) Inventors: Andre R. Turner, Belmont, MA (US);
Dongchen Wang, Concord, MA (US);
Hong Xiao, Acton, MA (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 99 days.

(21) Appl. No.: 12/974,677

(22) Filed: Dec. 21, 2010

(65) Prior Publication Data

US 2012/0157067 A1    Jun. 21, 2012

(51) Int. Cl.
*H04M 3/42*       (2006.01)
(52) U.S. Cl.
USPC ........ 455/417; 455/412.1; 455/415; 455/418; 455/445; 455/466; 455/550.1; 455/90.1
(58) Field of Classification Search
None
See application file for complete search history.

(56) References Cited

U.S. PATENT DOCUMENTS

| 6,154,530 | A | * | 11/2000 | Letellier | 379/142.06 |
| 6,301,338 | B1 | * | 10/2001 | Makela et al. | 379/88.21 |
| 6,622,021 | B1 | * | 9/2003 | Takala | 455/466 |
| 7,492,888 | B2 | * | 2/2009 | Power et al. | 379/265.13 |
| 7,515,699 | B2 | * | 4/2009 | Cooper et al. | 379/201.01 |
| 7,801,285 | B2 | * | 9/2010 | Makela et al. | 379/88.21 |
| 2008/0039068 | A1 | * | 2/2008 | Wang | 455/422.1 |
| 2010/0216509 | A1 | * | 8/2010 | Riemer et al. | 455/557 |

* cited by examiner

*Primary Examiner* — Willie J Daniel, Jr.

(57) ABSTRACT

A method, performed by a user device, may include detecting an incoming call; determining whether the incoming call is associated with a very important person contact; directing the incoming call to a voicemail system, when the incoming call is not associated with a very important person contact; and providing, when the incoming call is associated with the very important person contact, an instant response message to a device associated with the incoming call without answering the incoming call. The method may further include providing reminder, including a ranked callback list of missed calls, to the user at particular intervals.

20 Claims, 10 Drawing Sheets

CALL MANAGEMENT SYSTEM

BACKGROUND INFORMATION

A user of a mobile communication device, such as a cellular telephone, may use the mobile communication device as a primary tool of communication. For example, the user may use the mobile communication device to communicate with clients, co-workers, friends, and/or family members. Thus, at any given point in time, one or more people may be trying to reach the user via the mobile communication device. However, the user may be on another call or may be busy and unable to answer a call. This may result in multiple missed calls. Managing missed calls may be a troublesome task for the user.

DETAILED DESCRIPTION OF PREFERRED EMBODIMENTS

The following detailed description refers to the accompanying drawings. The same reference numbers in different drawings identify the same or similar elements. Also, the following detailed description does not limit the invention.

An implementation described herein may relate to managing incoming calls for a user based on whether the incoming call is from a contact that is on a very important person (VIP) list associated with the user. For example, if the user is on another call or has selected a busy status and a contact calls, who is not on the VIP list, a call management system may direct the call to a voicemail system and enter the call on a callback list. If the calling contact is on the VIP list, the user may select an instant response message to provide to the caller, without answering the call, and the call may be entered on the callback list. If the instant response message specifies a particular callback time, a calendar event may be created at the specified callback time in a calendar associated with the user. Furthermore, an IM application may be activated based on a selected instant response message. Examples of instant response messages that may be provided may include "I am on a call, but I can IM briefly," "Call You Back in 10 Minutes," or "Can't Talk, In a Meeting."

An implementation described herein may further relate to ranking missed calls based on one or more criteria, such as whether a caller associated with a missed call is on the VIP list, an urgency associated with the missed call; an age associated with the missed call; whether the missed call has been scheduled in a calendar; and/or a call history associated with the caller. A ranked list of missed calls may be generated as a callback list and provided to the user as a reminder at particular intervals. A user may be given the option to return the call, to schedule a calendar event to return the call, or to dismiss the call from the callback list. If the user returns a call, the call may be removed from the callback list.

Figure 1:
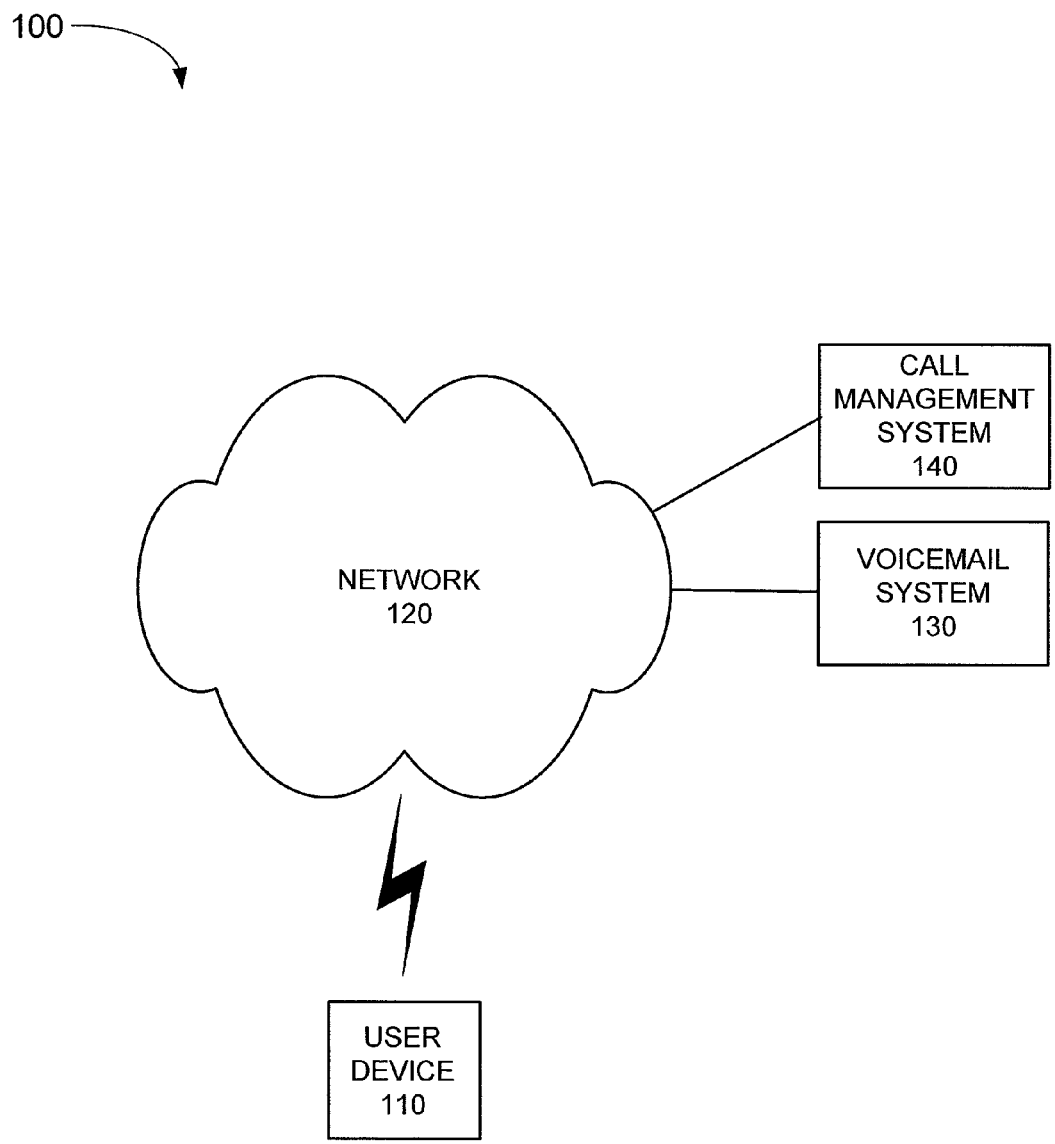
FIG. 1 is a diagram illustrating an example of components of a system according to an implementation described herein.

FIG. 1 is a diagram of a system 100 according to an implementation described herein. As shown in FIG. 1, system 100 may include a user device 110, a network 120, a voicemail system 130, and a call management system 140.

User device 110 may include any communication device capable of receiving telephone calls. For example, user device 110 may include a telephone terminal, a computer with voice over Internet Protocol (VoIP) capability, and/or a wireless communication device. In one example, user device 110 may include a wireless communication device that a user may use to connect to network 120 via wireless signals. User device 110 may include, for example, a mobile communication device, such as a mobile phone, a personal digital assistant (PDA), or a media playing device with communication capabilities; a desktop device, such as a personal computer or a workstation; a laptop computer; a telephone terminal; or any other communication device or combinations thereof.

Network 120 may include circuit-switched network and/or a packet-switched network, such as, for example, a local area network (LAN), a wide area network (WAN), a metropolitan area network (MAN), an optical network, a cable television network, a satellite television network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks.

Voicemail system 130 may include one or more devices (e.g., server devices) that manage voicemail services for user device 110. For example, if user device 110 does not respond to an incoming phone call, an incoming phone call may be directed to voicemail system 130 by call management system 140. Voicemail system 130 may include one or more prerecorded messages, associated with user device 110, which may be played to a caller associated with the incoming phone call. Voicemail system 130 may record a message from the caller. The recorded message may be accessed by use device 110 at a later time.

Call management system 140 may handle incoming calls for user device 110. For example, if user device 110 is associated with a busy status or is handling a phone call, call management system 140 may intercept an incoming call to user device 110 and may determine how to handle the incoming call. Call management system 140 may direct the incoming call directly to voicemail system 130 if a contact, associated with the incoming call, is not on a VIP list associated with user device 110. If the contact, associated with the incoming call, is on the VIP list, call management system 140 may prompt user device 110 to select an instant response message to send to the calling contact. If the calling contact accepts the instant response message from user device 110, call management system 140 may direct the incoming caller to voicemail system 140. If the calling contact does not accept the instant response message, call management system 140 may allow the calling contact to continue to attempt to connect to user device 110. Furthermore, a user associated with user device 110, and/or the calling contact may select to initiate an instant messenger (IM) session between user device 110 and a device associated with the calling contact, and call management system 140 may facilitate the initiation of the IM session between user device 110 and the device associated with the calling contact.

Although FIG. 1 shows example components of system 100, in other implementations, system 100 may include fewer components, different components, differently arranged components, and/or additional components than those depicted in FIG. 1. Alternatively, or additionally, one or more components of system 100 may perform one or more tasks described as being performed by one or more other components of system 100.

Figure 2:
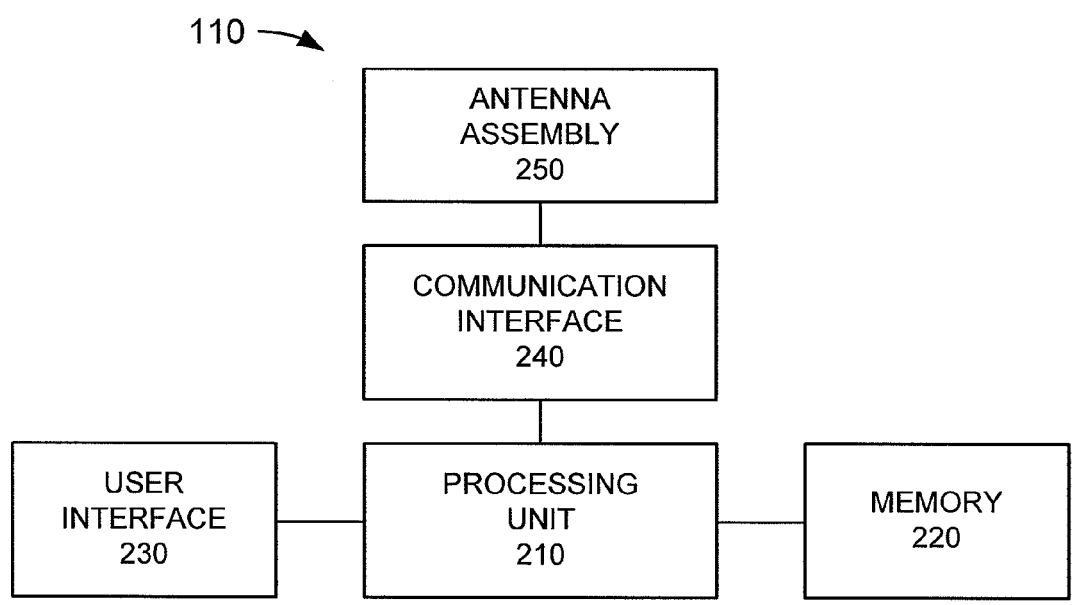
FIG. 2 is a diagram illustrating example components of a user device according to an implementation described herein.

FIG. 2 is a diagram illustrating example components of user device 110 according to an implementation described herein. As shown in FIG. 2, user device 110 may include a processing unit 210, a memory 220, a user interface 230, a communication interface 240, and an antenna assembly 250.

Processing unit 210 may include one or more processors, microprocessors, application specific integrated circuits (ASICs), field programmable gate arrays (FPGAs), or the like. Processing unit 210 may control operation of user device 110 and its components.

Memory 220 may include a random access memory (RAM), a read only memory (ROM), and/or another type of memory to store data and instructions that may be used by processing unit 210.

User interface 230 may include mechanisms for inputting information to user device 110 and/or for outputting information from user device 110. Examples of input and output mechanisms might include a speaker to receive electrical signals and output audio signals; a camera lens to receive image and/or video signals and output electrical signals; a microphone to receive audio signals and output electrical signals; buttons (e.g., a joystick, control buttons, or keys of a keypad) to permit data and control commands to be input into user device 110; a display to output visual information; and/or a vibrator to cause user device 110 to vibrate.

Communication interface 240 may include any transceiver-like mechanism that enables user device 110 to communicate with other devices and/or systems. For example, communication interface 240 may include a modem or an Ethernet interface to a LAN. Communication interface 240 may also include mechanisms for communicating via a wireless network, such as network 120. For example, communication interface 240 may include, for example, a transmitter that may convert baseband signals from processing unit 210 to radio frequency (RF) signals and/or a receiver that may convert RF signals to baseband signals. Alternatively, communication interface 240 may include a transceiver to perform functions of both a transmitter and a receiver. Communication interface 240 may connect to antenna assembly 350 for transmission and/or reception of the RF signals.

Antenna assembly 250 may include one or more antennas to transmit and/or receive RF signals over the air. Antenna assembly 250 may, for example, receive RF signals from communication interface 240 and transmit them over the air and receive RF signals over the air and provide them to communication interface 240.

As described herein, user device 110 may perform certain operations in response to processing unit 210 executing software instructions contained in a computer-readable medium, such as memory 220. A computer-readable medium may be defined as a non-transitory memory device. A memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows example components of user device 110, in other implementations, user device 110 may include fewer components, different components, differently arranged components, or additional components than depicted in FIG. 2. Additionally or alternatively, one or more components of user device 110 may perform the tasks described as being performed by one or more other components of user device 110.

Figure 3:
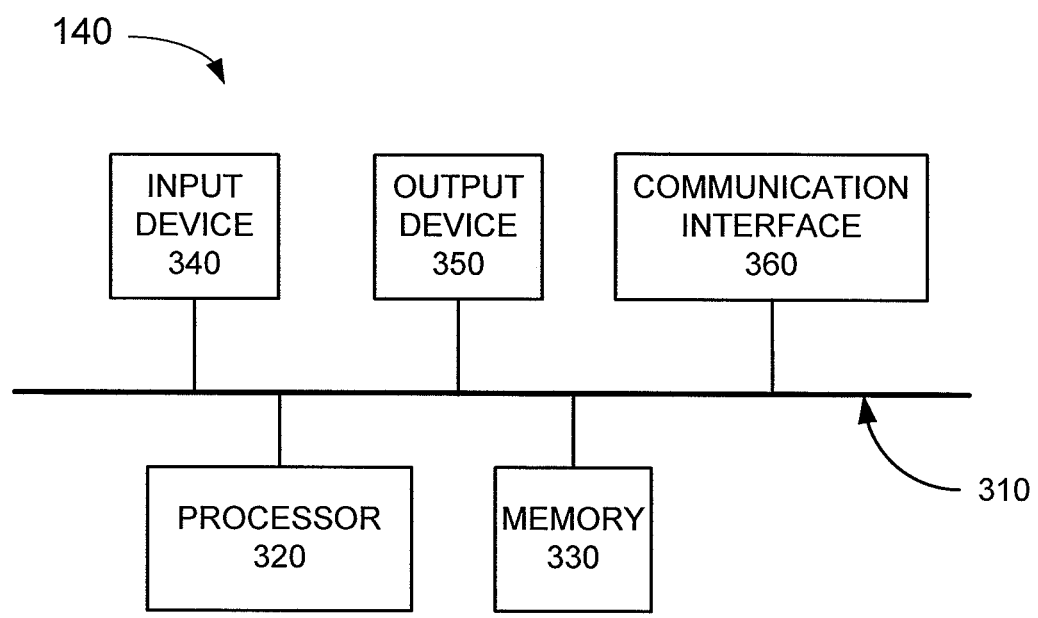
FIG. 3 is a diagram of example functional components of a server device according to an implementation described herein.

FIG. 3 is a diagram illustrating example components of a call management system 140 according to a first implementation described herein. As shown in FIG. 3, call management system 140 may include a bus 310, a processor 320, a memory 330, an input device 340, an output device 350, and a communication interface 360.

Bus 310 may include a path that permits communication among the components of call management system 140. Processor 320 may include one or more processors, microprocessors, or processing logic (e.g., ASICs or FPGAs) that may interpret and execute instructions. Memory 330 may include a RAM device or another type of dynamic storage device that may store information and instructions for execution by processor 320, a ROM device or another type of static storage device that may store static information and instructions for use by processor 320, a magnetic and/or optical recording memory device and its corresponding drive, and/or a removable form of memory, such as a flash memory.

Input device 340 may include a mechanism that permits an operator to input information to call management system 140, such as a keypad, a keyboard, a button, or an input jack for an input device such as a keypad or a keyboard, etc. Output device 350 may include a mechanism that outputs information to the operator, including one or more light indicators, a display, a speaker, etc.

Communication interface 360 may include any transceiver-like mechanism that enables call management system 140 to communicate with other devices and/or systems. For example, communication interface 360 may include a modem, a network interface card, and/or a wireless interface card.

As will be described in detail below, call management system 140 may perform certain operations. Call management system 140 may perform these operations in response to processor 320 executing software instructions stored in a computer-readable medium, such as memory 330.

The software instructions may be read into memory 330 from another computer-readable medium, or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of call management system 140, in other implementations, call management system 140 may include fewer components, different components, additional components, or differently arranged components than depicted in FIG. 3. Additionally or alternatively, one or more components of call management system 140 may perform one or more tasks described as being performed by one or more other components of call management system 140.

Figure 4A:
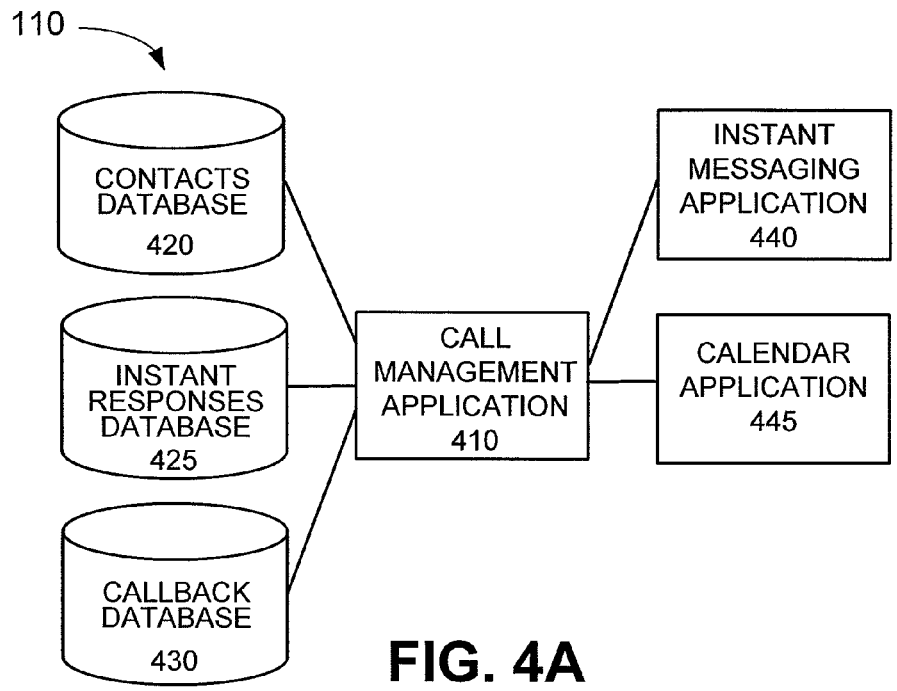
FIG. 4A is a diagram of example functional components of a user device according to an implementation described herein.

FIG. 4A is a diagram of example functional components of user device 110 according to an implementation described herein. As shown in FIG. 4A, user device 110 may include a call management application 410, a contacts database 420, an instant responses database 425, a callback database 430, an IM application 440, and a calendar application 445.

Call management application 410 may communicate with call management system 140 to handle incoming calls to user device 110. For example, call management application 410 may receive an indication of an incoming call from call management system 140. In one example, call management application 410 may select an instant response message based on one or more parameters, such as, for example, an identity of a caller associated with an incoming call, a status associated with user device 110, and/or a particular instant response message selected by a user of user device 110. In another example, call management application 410 may prompt the user to select an instant response message to be provided to the caller. Call management application 410 may also set up an IM session between user device 110 and a device associated with the caller by activating IM application 440.

Additionally, call management application 140 may handle a callback list for user device 110. For example, call management application 140 may enter the incoming call on a callback list by storing information about the incoming call in callback database 430. Call management application 140 may calculate a callback score for the incoming call and rank the incoming call in a callback list based on the calculated callback score. Call management application 140 may also schedule a callback, associated with the incoming call, by contacting calendar application 445. Call management application 140 may provide reminders to the user by providing a ranked callback list to the user at particular intervals, and/or by providing reminders to the user about callbacks scheduled by calendar application 445.

Contacts database 420 may store information about contacts associated with the user of user device 110. Contacts database 420 may store an indication, associated with a particular contact, about whether the contact is a VIP contact. The indication may include a particular VIP label assigned to the contact. For example, a user may assign a first VIP label to contacts considered by the user to be immediate family, a second VIP label to contacts considered by the user to be the user's boss and/or manager; a third VIP label to contacts considered by the user to be important clients; etc.

Instant responses database 425 may store information about instant response messages that may be provided in response to an incoming call from a VIP contact. Example fields that may be stored in instant responses database 425 are described below with reference to FIG. 5A.

Callback database 430 may store information about missed calls to user device 110 and which may be used to provide a reminder with a ranked list of missed calls to the user of user device 110. Example fields that may be stored in callback database 430 are described below with reference to FIG. 5B.

IM application 440 may manager IM sessions between user device 110 and another device. IM application 440 may be automatically activated by call management application 410, in response to a particular instant response message being sent to a device associated with an incoming call, to set up an IM session with the device associated with the incoming call.

Calendar application 445 may manage calendar events. For example, calendar application 445 may store a calendar event associated with a scheduled callback and may provide information about the calendar event to call management application 510.

Although FIG. 4A shows example functional components of user device 110, in other implementations, user device 110 may include fewer functional components, different functional components, differently arranged functional components, or additional functional components than depicted in FIG. 4A. Additionally or alternatively, one or more functional components of user device 110 may perform one or more tasks described as being performed by one or more other functional components of user device 110.

Figure 4B:
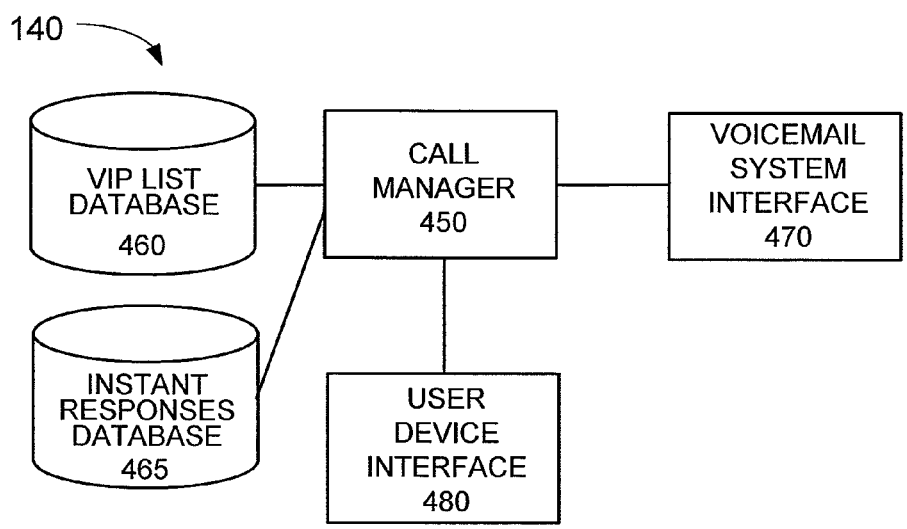
FIG. 4B is a diagram of example functional components of a call management system according to an implementation described herein.

FIG. 4B is a diagram of example functional components of call management system 140 according to an implementation described herein. As shown in FIG. 4B, call management system 140 may include a call manager 450, a VIP list database 460, an instant responses database 465, a voicemail system interface 470, and a user device interface 480.

Call manager 450 may manage incoming calls for user device 110. For example, call manager 450 may intercept an incoming call to user device 110 and may determine whether the incoming call is associated with a VIP contact, associated with user device 110, by accessing VIP list database 460. Call manager 450 may direct the incoming call directly to voicemail system 130 if a contact, associated with the incoming call, is not on a VIP list associated with user device 110. If the contact, associated with the incoming call, is on the VIP list, call manager 450 may prompt user device 110, via mobile device interface 480, to select an instant response message to send to the calling contact. If the calling contact accepts the instant response message from user device 110, call manager 450 may direct, via voicemail system interface 470, the incoming caller to voicemail system 140.

VIP list database 460 may store information that associates a particular user device 110 with a list of VIP contacts. For example, user device 110 may, at periodic intervals, provide a list of VIP contacts, along with a VIP label associated with a particular VIP contact, to call manager 450 and call manager 450 may store the information in VIP list database 460.

Instant responses database 465 may store information that associates a particular user device 110 with a list of instant response messages. For example, user device 110 may, at periodic intervals, provide a list of instant response messages, along with information associated with particular instant response messages, as stored in instant responses database 425 of user device 110, to call manager 450. Call manager 450 may store the information in instant responses database 465. Thus, in one example, an instant response message may be provided to an incoming call, associated with a VIP contact, without receiving an instant response message from user device 110. In another example, user device 110 may provide an instant response message in response to an incoming call.

Voicemail interface 470 may communicate with voicemail system 130. For example, voicemail interface 470 may forward an incoming call to voicemail system 130 in response to a decision from call manager 450 to forward the incoming call to voicemail system 130.

User device interface 480 may communicate with user device 110. For example, user device interface 480 may receive information from user device 110 and may forward the received information to call manager 450. User device interface 480 may also receive a message from call manager 450 for user device 110, may transform the message to a format compatible with user device 110, and may transmit the transformed message to user device 110 via network 120.

Although FIG. 4B shows example functional components of call management system 140, in other implementations, call management system 140 may include fewer functional components, different functional components, differently arranged functional components, or additional functional components than depicted in FIG. 4B. Additionally or alternatively, one or more functional components of call management system 140 may perform one or more tasks described as being performed by one or more other functional components of call management system 140.

Figure 5A:
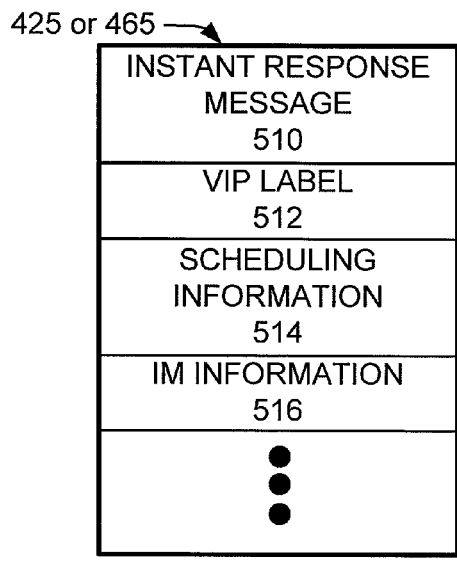
FIG. 5A is a diagram of example fields that may be stored in an instant responses database according to an implementation described herein.

FIG. 5A is a diagram of example fields that may be stored in instant responses database 425 or instant responses database 465 according to an implementation described herein. In one implementation, instant responses database 425 may be implemented in a storage device included as part of memory 220. In another implementation, instant responses database 425 may be stored in a memory associated with another device or a group of devices, separate from or including memory 220. In one implementation, instant responses database 465 may be implemented in a storage device included as part of memory 330. In another implementation, instant responses database 465 may be stored in a memory associated with another device or a group of devices, separate from or including memory 330.

As shown in FIG. 5A, instant responses database 425 may include one or more instant response records 500 (referred to herein collectively as "instant response records 500" and individually as "instant response record 500"). Instant response record 500 may include an instant response message field 510, a VIP label field 512, a scheduling information field 514, and an IM information field 516.

Instant response message field 510 may store information about a particular instant response that may be provided to a caller. In one example, the information may include an audio file that may be played to a caller. In another example, the information may include a text message that may be displayed on a device associated with the caller. The audio file and/or text may be input by the user via user interface 230 using call management application 410. In yet another example, the information may include an image. In yet another example, the information may include a video file.

VIP label field 512 may store information about a particular VIP label associated with the particular instant response. For example, when an incoming call to user device 110 is received from a particular contact, and the particular contact is associated with the particular VIP label in contacts database 420 of user device 110, the particular instant response may be provided to the device associated with the particular contact.

Scheduling information field 514 may store information about whether a calendar event is to be created when the particular instant response is provided to a caller. For example, if the particular instant response corresponds to a message stating "Call You Back in 10 Minutes," scheduling information field may include an instruction to create a calendar event ten minutes from a current time to call the number associated with the caller which received the particular instant response. In one example, the information stored in scheduling information field 514 may be explicitly created by a user. In another example, the information stored in scheduling information field 514 may be generated automatically by call management application 410 and/or by call manager 450 using entity recognition techniques performed on text and/or audio stored in instant response message field 510 (e.g., by comparing the text and/or audio, transcribed using speech recognition techniques to text, to a list of terms associated with calendar events).

IM information field 516 may store information about whether an IM session is to be initiated when the particular instant response is provided to a caller.

Instant response records 500 may be created by a user associated with user device 110. For example, a user may activate an option, associated with call management application 410, to generate a new instant response record 500. The user may then enter text associated with the new instant response and/or record audio associated with the instant response; may specify a VIP label associated with the new instant response; may specify scheduling information associated with the new instant response; and/or may specify whether an IM session is to be initiated when the new response is sent to a caller. Additionally or alternatively, call management system 140 may include pre-generated instant responses, stored in instant response database 465, which may be provided to user device 110.

Although FIG. 5A shows example fields that may be stored in instant responses database 425 or instant responses database 465, in other implementations, instant responses database 425 or instant responses database 465 may include fewer fields, different fields, differently arranged fields, and/or additional fields than depicted in FIG. 5A.

Figure 5B:
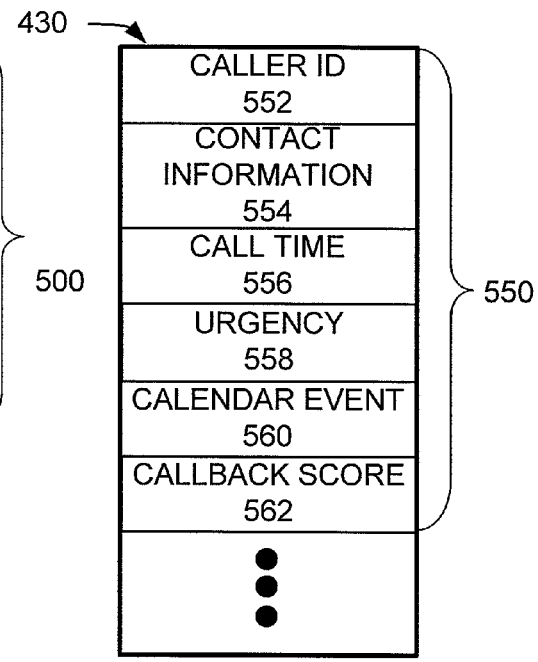
FIG. 5B is a diagram of example fields that may be stored in a callback database according to an implementation described herein.

FIG. 5B is a diagram of example fields that may be stored in callback database 430 according to an implementation described herein. In one implementation, callback database 430 may be implemented in a storage device included as part of memory 220. In another implementation, callback database 430 may be stored in a memory associated with another device or a group of devices, separate from or including memory 220. As shown in FIG. 5B, callback database 430 may include one or more callback records 550 (referred to herein collectively as "callback records 550" and individually as "callback record 550"). Callback record 550 may include a caller identification (ID) field 552, a contact information field 554, a call time field 556, an urgency field 558, a calendar event field 560, and a callback score 562.

Caller ID field 552 may store information identifying a particular caller associated with a missed call. For example, caller ID field 552 may correspond to a name, associated with the caller, stored in contacts database 420. Contact information field 554 may store contact information associated with the particular caller. The contact information may be obtained from contacts database 420, from call management system 140, and/or from a device associated with the caller. The contact information may include, for example, a particular phone number associated with the caller, a particular IM address associated with the caller, and/or a particular email address associated with the caller.

Call time field 556 may store information about a time and/or date identifying when a missed call was received. Urgency field 558 may store information identifying whether the missed call was marked urgent by the caller. A caller may have the option to mark a call as urgent. For example, voicemail system 130 may prompt the user to press a particular key to indicate that the call is urgent. Calendar event field 560 may store information about whether a calendar event has been created in association with the missed call.

Callback score 562 may store information about a callback score assigned to the missed call. The callback score may be used to rank the missed call in a callback list. An example function for computing the callback score is described below with reference to FIG. 6.

Although FIG. 5B shows example fields that may be stored in callback database 430, in other implementations, callback database 430 may include fewer fields, different fields, differently arranged fields, and/or additional fields than depicted in FIG. 5B.

Figure 6:
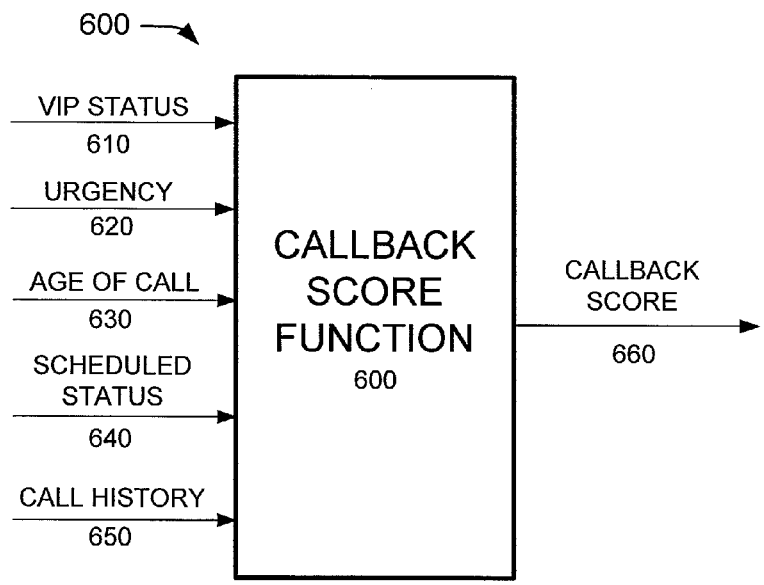
FIG. 6 is a diagram of an example callback score function according to an implementation described herein.

FIG. 6 is a diagram of an example callback score function 600 according to an implementation described herein. Callback score function 600 may, for a call, take as input values for one or more of the depicted parameters and generate a callback score 660.

Callback score function 600 may include a VIP status input 610. VIP status input 610 may indicate whether a caller, associated with the missed call, is a VIP contact associated with the user associated with user device 110. If the missed call is associated with a VIP contact, VIP status input 610 may further include a VIP label associated with the contact. A benefit of using the VIP status of a caller as an input to callback score function 600 may include identifying callers that are important to the users. If a missed call is associated with a VIP contact, callback score function 600 may generate a higher callback score 660 than if the missed call is not associated with a VIP contact.

Callback score function 600 may include an urgency input 620. Urgency input 620 may indicate whether the caller, associated with the missed call, indicated that the call is urgent. A benefit of using an urgency indication as an input to callback score function 600 may include identifying missed calls that are urgent. If a missed call is indicated as urgent, callback score function 600 may generate a higher callback score 660 than if the missed call is not indicated as urgent.

Callback score function 600 may include an age of call input 630. Age of call input 630 may include information indicating how much time has passed since the missed call was received. A benefit of using an age of a call as an input to callback score function 600 may include identifying older calls, which may need to be returned sooner than calls received more recently. Callback score function 600 may generate a higher callback score 660 for a missed call with a greater age than for a more recent missed call.

Callback score function 600 may include a scheduled status input 640. Scheduled status input 640 may include information about whether the missed call is associated with a calendar event. A benefit of using a scheduled status indication as an input to callback score function 600 may include identifying missed calls that have an upcoming scheduled callback. Callback score function 600 may generate a higher callback score 660 for a missed call if the missed call is associated with an upcoming (e.g., within an hour) scheduled calendar event to remind the user to return the call.

Callback score function 600 may include a call history input 650. Call history input 650 may include information about a call history associated with a number associated with the missed call. Information about the call history may be determined, for example, by accessing a call history record associated with user device 110. A benefit of using call history as an input to callback score function 600 may include identifying missed calls which are associated with recent activity. For example, if the user associated with user device 110 placed a call to a number associated with the missed call within a particular period of time and/or if the user actually carried on a phone conversation with a caller associated with the number, callback score function 600 may generate a higher callback score 660 for a missed call than if there is no record in the call history associated with the number.

One or more of the inputs of callback score function 600 may be combined to generate a callback score 660 for a missed call. In one example, inputs of callback score function 600 may be combined as a weighted sum. In other words, each of the inputs of callback score function 600 may be multiplied by a weight and the results may be added to generate callback score 660. For example, VIP status input 610 may be given a greater weight than the other inputs, and thus callback score 660 may depend most significantly on VIP status input 610. In another example, particular inputs of callback score function 600 may not influence callback score 660 unless the values associated with the particular inputs are greater (or less than) an input. For example, age of call input 630 may not influence callback score 660 until the call is older than 24 hours.

Although FIG. 6 shows exemplary inputs of callback score function 600, in other implementations, callback score function 600 may contain fewer inputs, different inputs, or additional inputs, than depicted in FIG. 6.

Figure 7:
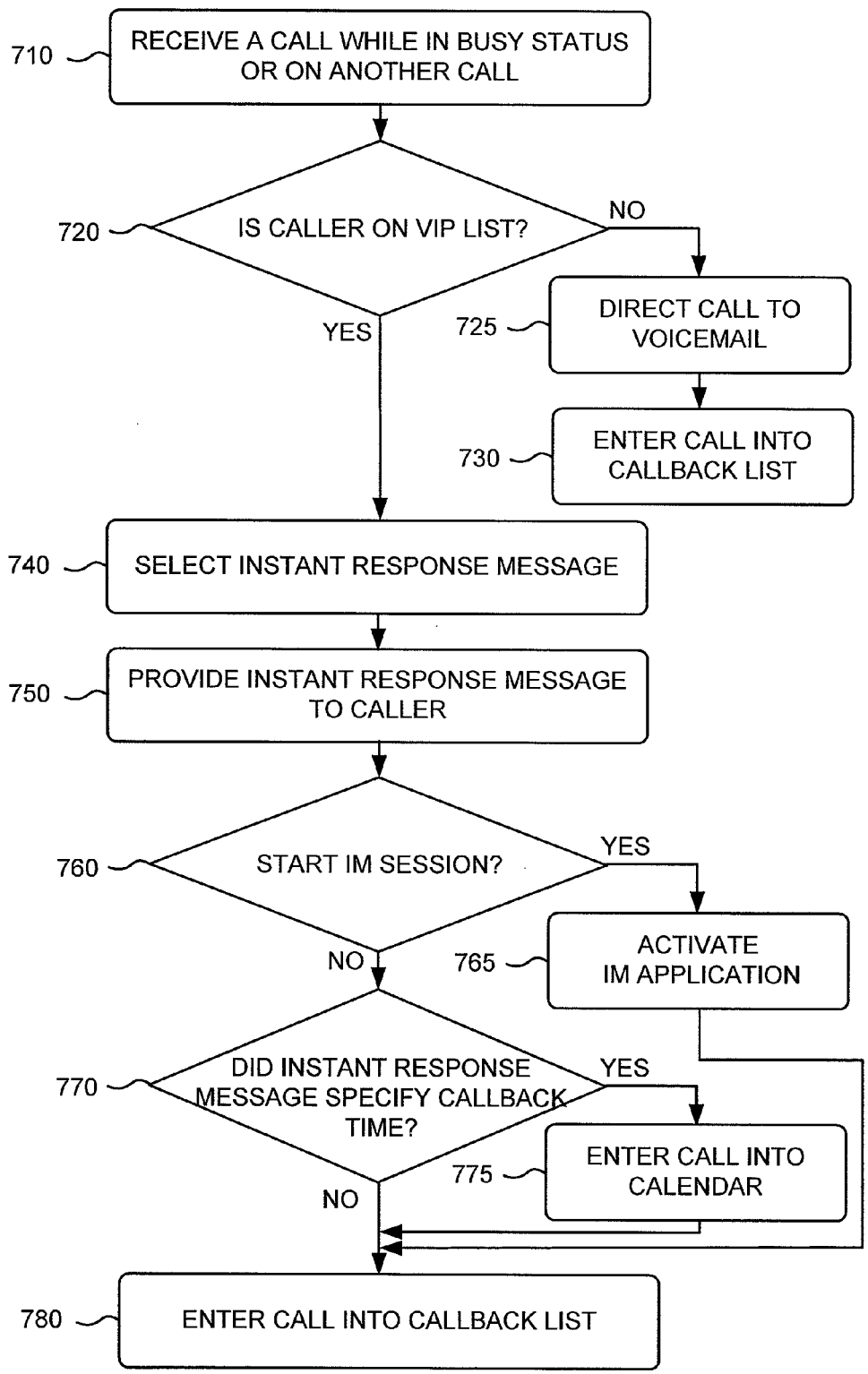
FIG. 7 is flow diagram illustrating a process for managing an incoming call according to an implementation described herein.

FIG. 7 is flow diagram illustrating a process for managing an incoming call according to an implementation described herein. In one implementation, the process of FIG. 7 may be performed by call management system 140 and/or user device 110. In other implementations, some or all of the process of FIG. 7 may be performed by another device or a group of devices separate from and/or possibly remote from call management system 140 and/or user device 110 and/or including call management system 140 and/or user device 110.

The process of FIG. 7 may include receiving a call while in a busy status or on another call (block 710). For example, call management system 140, and/or user device 110, may detect an incoming call while user device 110 is under another call or while in a busy status (e.g., selected by the user of user device 110).

A determination may be made as to whether the caller is on a VIP list (block 720). For example, call manager 450 may access VIP list database 460, and/or call management application 410 may access contacts database 420, to determine whether the number of the incoming call is associated with a contact designated as a VIP contact. If it is determined that the caller is not on the VIP list (block 720—NO), the call may be directed to voicemail (block 725). For example, call manager 450 may instruct voicemail system interface 470 to forward the incoming call to voicemail system 130. The call may be entered into a callback list (block 730). For example, call manager 450 may instruct user device interface 480 to forward the call to call management application 410. Call management application may calculate a callback score 660 for the missed call using callback score function 600 and may create a callback record 500, associated with the missed call, in callback database 430.

Returning to block 720, if it is determined that the caller is on the VIP list (block 720—YES), an instant response message may be selected (block 740). In one example, call manager 450 may select an instant response message automatically by accessing instant responses database 465 or call management application 410 may select an instant response message automatically by accessing an instant responses database 425. An instant response message may be selected automatically based on a VIP label associated with the contact. For example, if the incoming call is associated with a VIP label "wife," an instant message stating "Call you in a couple of minutes, honey" may be selected. As another example, if the incoming call is associated with a VIP label client "client," an instant message stating "I apologize for being unavailable. I will return your call within one hour" may be selected. In another example, the user associated with user device 110 may be prompted to select an instant response. For example, call management application 410 may display, via user interface 230, one or more available instant responses, selectable as buttons. The user may select a particular instant response by click in a button associated with the particular instant response An instant response message may be provided to the caller (block 750). For example, call management application 410, or call manager 450, may provide the selected instant response message to a device associated with the incoming call, without answering the incoming call. For example, the selected instant response message may be sent to the device to be displayed on a screen associated with the device. In one example, the message may be sent as an IM message. In another example, the message may be sent as an executable file that generates a pop-up message. In yet another example, the message may be displayed by call management application 410 installed on the device associated with the incoming call. In yet another example, if the instant response message corresponds to an audio file, the audio file may be provided to be played by a speaker associated with the device.

A determination may be made as to whether an IM session is to be initiated (block 760). For example, call management application 410, or call manager 450, may access IM information field 516, associated with the select instant response, to determine whether IM application 440 should be activated.

If it is determined that an IM session is to be initiated (block 760—YES), an IM application may be activated (block 765). For example, call management application 410 may activate IM application 440 and may provide to IM application 440 an IM address associated with the incoming call. If call management application 410 is unable to determine an IM address associated with the incoming call, call management application 410 may query call management system 140 for the IM address. As another example, call manager 450 may send an instruction, via user device interface 480, to user device 110 to activate IM application 440. Processing may continue to block 780. Once IM application 440 is activated, the user and the caller may exchange IM messages without the user having to answer the call.

Returning to block 760, if it is determined that an IM session is not to be initiated (block 760—NO), a determination may be made as to whether the instant response message specified a callback time (block 770). For example, call management application 410, or call manager 450, may access scheduling information field 514, associated with the select instant response, to determine whether calendar application 445 should be activated.

If it is determined that a callback time was specified (block 770—YES), calendar application 445 may be activated. For example, call management application 410 may instruct calendar application 445 to create a calendar event associated with the incoming call at a time specified in scheduling information field 514. As another example, call manager 450 may send an instruction, via user device interface 480, to user device 110 to activate calendar application 445. For example, if the selected instant response stated "I apologize for being unavailable. I will return your call within one hour" when client X calls, calendar application 445 may enter a calendar event for 30 minutes from a current time stating "Call Client X." Processing may continue to block 780.

If it is determined that a callback time was not specified (block 770—NO), the call may be entered into a callback list (block 780). For example, call manager 450 may instruct user device interface 480 to forward the call to call management application 410. Call management application may calculate a callback score 660 for the missed call using callback score function 600 and may create a callback record 500, associated with the missed call, in callback database 430.

Figure 8A:
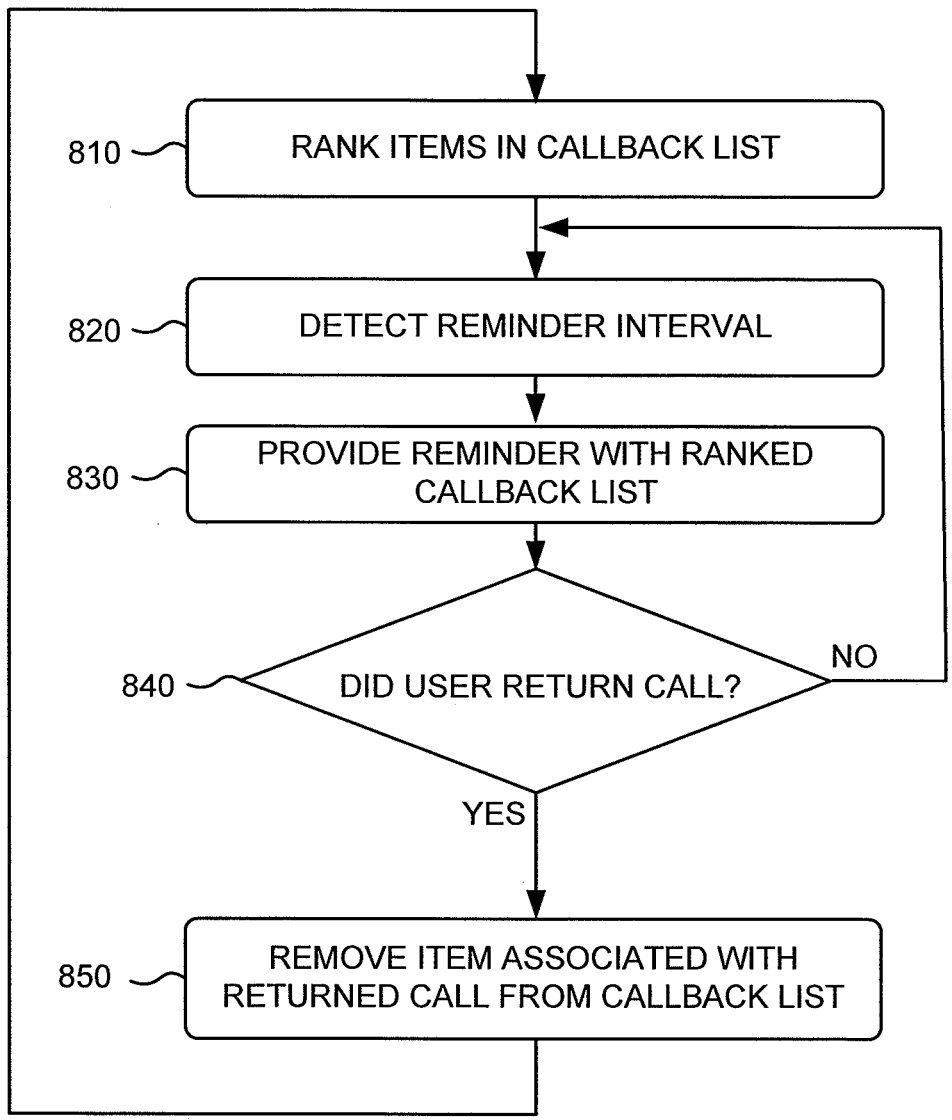
FIG. 8A is a flow diagram illustrating a first process for providing a callback reminder to a user.

FIG. 8A is a flow diagram illustrating a first process for providing a callback reminder to a user. In one implementation, the process of FIG. 8A may be performed by user device 110. In other implementations, some or all of the process of FIG. 8A may be performed by another device or a group of devices separate from and/or possibly remote from user device 110 and/or including user device 110.

The process of FIG. 8A may include ranking items in a callback list (block 810). For example, call management application 410 may generate a callback score 660 for each missed call stored in callback database 430 using callback score function 600 and may generate a ranked list of missed calls arranged based on the callback scores.

A reminder interval may be detected (block 820). For example, call management application 410 may be configured to display a reminder along with a callback list, and/or provide an audible reminder, via user interface 230 at particular intervals (e.g., every 30 minutes). The particular intervals may be configurable by the user.

A reminder may be provided with a ranked callback list (block 830). For example, when the particular interval is detected, call management application 410 may display the ranked callback list via user interface 230. An example user interface associated with the reminder and the callback list is described below with reference to FIG. 10. Additionally or alternatively, call management application 410 may generate an audio reminder (e.g., a tone or a voice message) and/or may activate a vibrator mechanism associated with user interface 230.

A determination may be made as to whether the user returned a call (block 840). For example, when the callback list is displayed, the user may select to return a particular call from the callback list. If it is determined that the user returned a call (block 840—YES), the item associated with the returned call may be removed from the callback list, and processing may return to block 810 (e.g., the callback list may be re-ranked). If it is determined that the user did not return a call (block 840—NO), processing may return to block 820 (e.g., waiting for a next reminder interval).

Figure 8B:
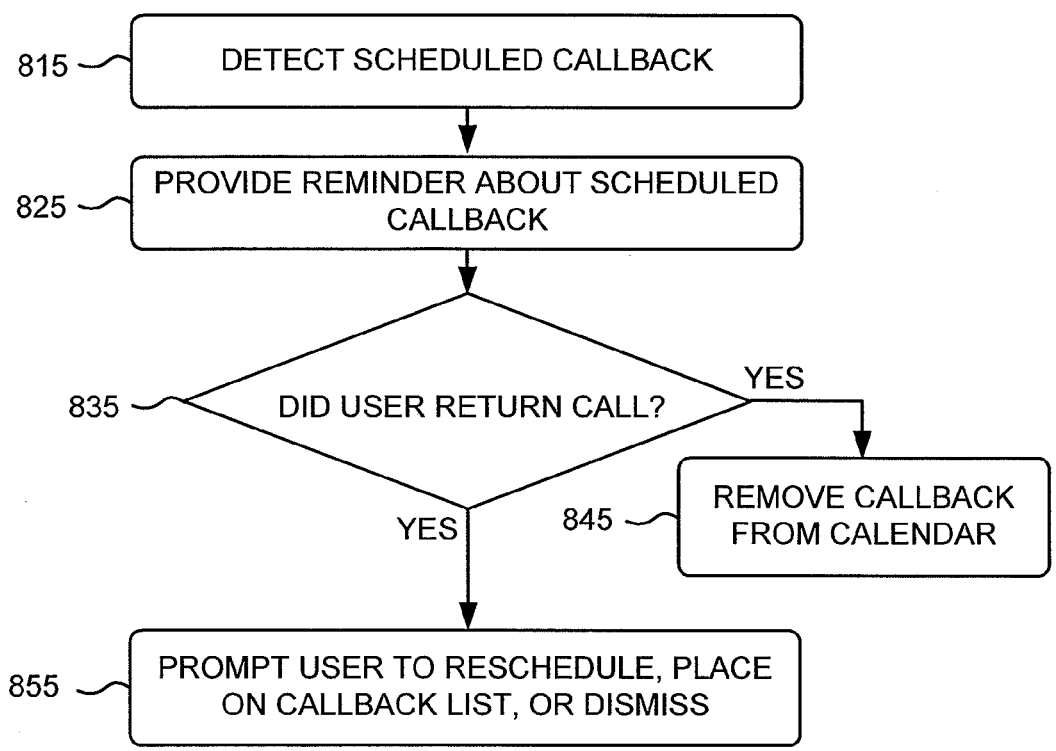
FIG. 8B is a flow diagram illustrating a second process for providing a callback reminder to a user.

FIG. 8B is a flow diagram illustrating a second process for providing a callback reminder to a user. In one implementation, the process of FIG. 8B may be performed by user device 110. In other implementations, some or all of the process of FIG. 8B may be performed by another device or a group of devices separate from and/or possibly remote from user device 110 and/or including user device 110.

The process of FIG. 8B may include detecting a scheduled callback (block 815). For example, call management application 410 may monitor calendar application 445 to determine whether there is an upcoming scheduled callback. A scheduled callback may be determined to be an upcoming scheduled callback when a scheduled time associated with the scheduled callback is within a particular interval (e.g., 15 minutes) of a current time.

A reminder may be provided about the scheduled callback (block 825). For example, call management application 410 may display a reminder, via user interface 230, informing the user that a callback is scheduled.

A determination may be made as to whether the call was returned (block 835). For example, call management application 410 may determine whether the user placed a call to the number associated with the scheduled callback. If it is determined that the call was returned (block 835—YES), the callback may be removed from the calendar. For example, call management application 410 may instruct calendar application 445 to remove the calendar event associated with the scheduled callback.

If it determined that the call was not returned (block 835—NO), the user may be prompted to reschedule the callback, place the callback on a callback list, or to dismiss the callback. For example, call management application 410 may provide an option to the user to reschedule the callback, to put the callback on a callback list (which may result in repeated reminders at particular intervals), or to dismiss the callback.

Figure 9:
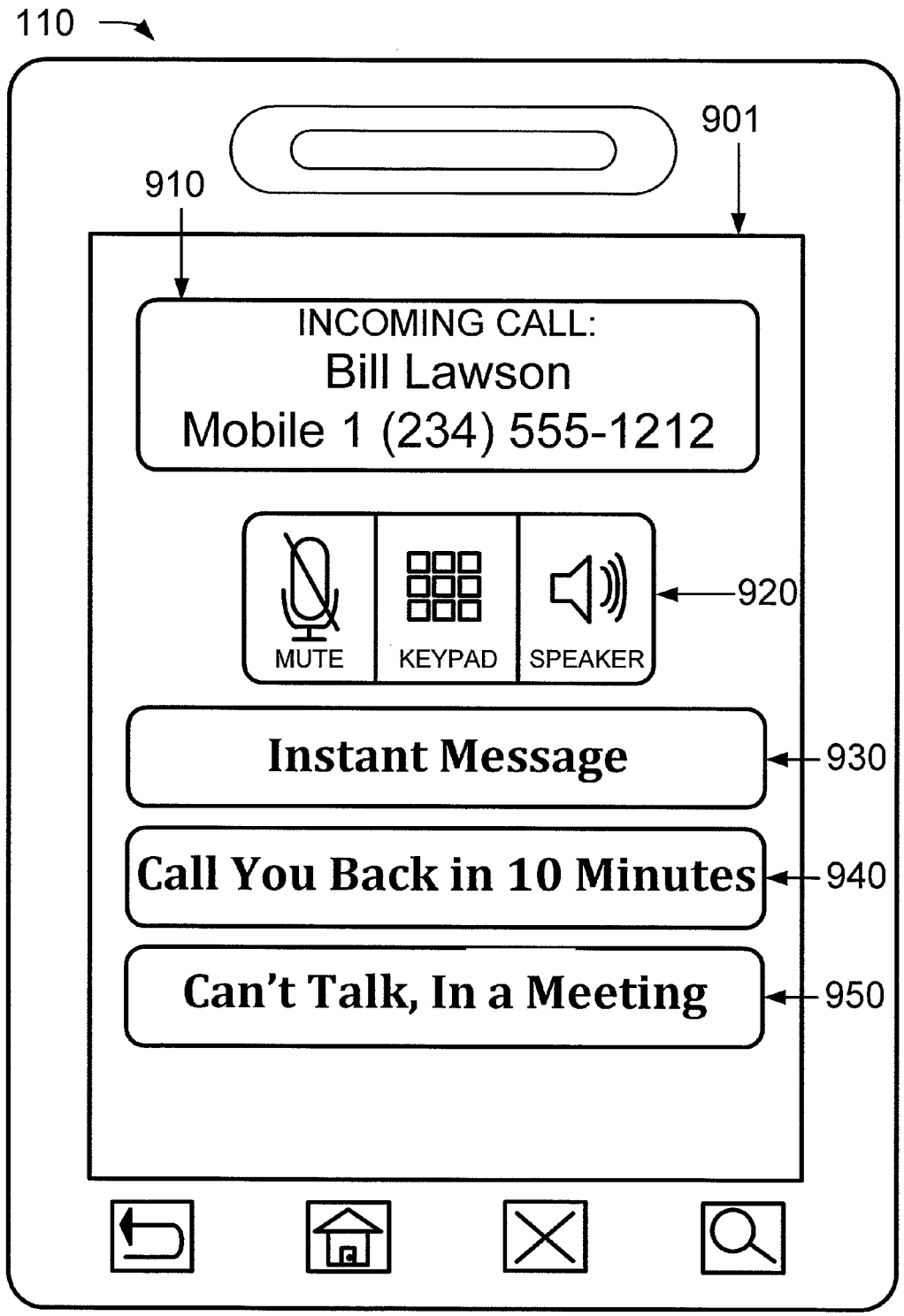
FIG. 9 is a diagram of a first example of a user interface according an implementation described herein.

FIG. 9 is a diagram of a first example user interface 901 according an implementation described herein. As shown in FIG. 9, user interface 901 may include an incoming call indication 910, a call menu 920, and one or more instant response buttons 930 to 950.

Incoming call indication 910 may display a name and a number associated with an incoming call. Call menu 920 may provide one or more options to manage the incoming call, such as answering the call, muting a ring tone and/or ignoring the call, and/or answering the call in a speaker mode.

Instant response button 930 may allow the user to set up an instant messaging session with the caller, without answering the phone call. When a user presses instant response button 930, call management application 410 may send a message to the device associated with the incoming call, such as, for example "Can't talk right now, but I can IM briefly." Additionally, call management application 410 may activate IM application 440.

Instant response button 940 may allow the user to send a message to the device associated with the incoming call stating "Call You Back in 10 Minutes." When a user presses instant response button 940, call management application 410 may send the message to the device associated with the incoming call. Furthermore, call management application 410 may activate calendar application 445 to create a calendar event 10 minutes from a current time to remind the user to return the incoming call.

Instant response button 950 may allow the user to send a message to the device associated with the incoming call stating "Can't Talk Now, In a Meeting." When a user presses instant response button 950, call management application 410 may send the message to the device associated with the incoming call.

Although FIG. 9 shows example items that may be included in user interface 901, in other implementations, user interface 901 may include fewer items, different items, differently arranged items, and/or additional items than depicted in FIG. 9.

Figure 10:
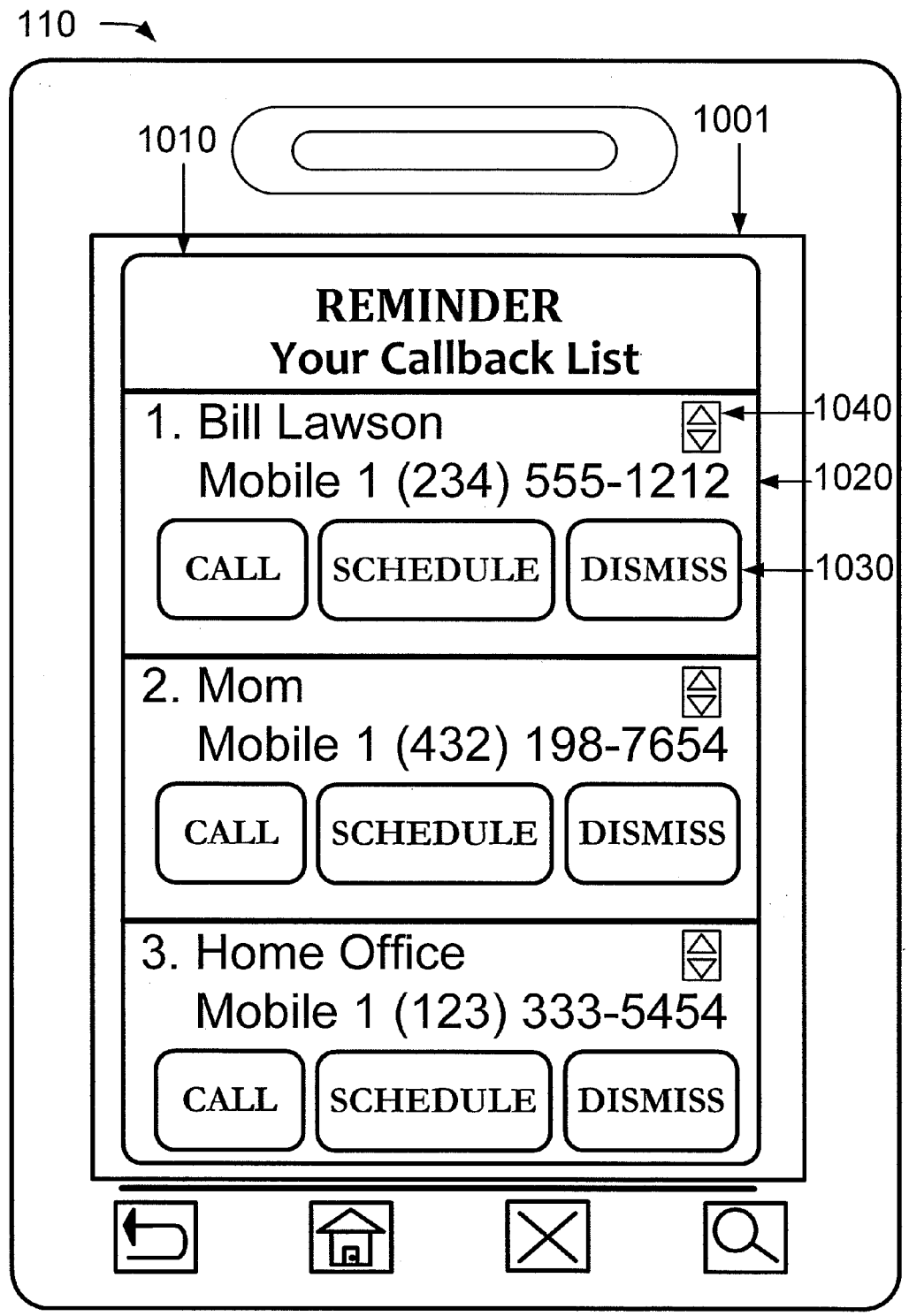
FIG. 10 is a diagram of a second example of a user interface according an implementation described herein.

FIG. 10 is a diagram of a first example user interface 1001 according an implementation described herein. As shown in FIG. 10, user interface 1001 may include a reminder 1010. Reminder 1010 may provide a reminder to the user about calls that the user is to return. Reminder 1010 may include one or more callback items 1020 ranked based on callback scores associated with the callback items. Callback item 1020 may include a name and number of a contact associated with a missed call. Callback item 1020 may include one or more buttons 1030 and a rearrange button 1040.

Buttons 1030 may provide the user with options to act on a callback item. For example, the use may press a first button to return the call, may press a second button to schedule a callback in a calendar, or may press a third button to dismiss the callback item. Rearrange button 1040 may allow the user to move a callback button up or down the list (e.g., to override the rank score associated with the callback button).

Although FIG. 10 shows example items that may be included in user interface 1001, in other implementations, user interface 1001 may include fewer items, different items, differently arranged items, and/or additional items than depicted in FIG. 10.

The foregoing description of implementations, described above, provides illustration and description, but is not intended to be exhaustive or to limit the invention to the precise form disclosed. Modifications and variations are possible in light of the above teachings or may be acquired from practice of the invention.

While series of blocks have been described with regard to FIGS. 7, 8A, and 8B, the order of the blocks may be modified in other implementations. Further, non-dependent blocks may be performed in parallel.

Also, certain portions of the implementations may have been described as a "component," "application," "interface," or "manager" that performs one or more functions. The terms "component," "application," "interface," and "manager" may include hardware, such as a processor, an ASIC, or a FPGA, or a combination of hardware and software (e.g., software running on a processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a user device, the method comprising:

detecting, by the user device, an incoming call;

determining, by the user device, whether the incoming call is associated with a very important person contact;

directing, by the user device, the incoming call to a voicemail system, when the incoming call is not associated with the very important person contact;

providing, by the user device and when the incoming call is associated with the very important person contact, an instant response message to a device associated with the incoming call without answering the incoming call;

determining, by the user device and when the incoming call is associated with the very important person contact, whether the instant response message is accepted by a calling contact associated with the incoming call, the calling contact being the very important person contact; and directing, by the user device, the calling contact to the voicemail system when the incoming call is associated with the very important person contact and when the instant response message is accepted by the calling contact.

2. The method of claim 1, further comprising:

selecting the instant response message, from a plurality of instant response messages, based on a very important person label associated with the incoming call.

3. The method of claim 1, further comprising:

prompting, when the incoming call is associated with the very important person contact, a user, associated with the user device, to select the instant response message, from a plurality of instant response messages, to send to the calling contact; and determining, when the incoming call is associated with the very important person contact, a selection of the instant response message before providing the instant response message.

4. The method of claim 1, further comprising:

determining whether the instant response message is associated with an instruction to create a calendar event; and creating a calendar event to remind a user, associated with the user device, to return the incoming call, when the instant response message is associated with the instruction to create the calendar event.

5. The method of claim 4, where the instant response message specifies a particular time in which the incoming call will be returned, and where the calendar event is created based on the particular time.

6. The method of claim 4, further comprising:

providing a reminder to a user, associated with the user device, based on the created calendar event.

7. The method of claim 1, further comprising:

determining that the instant response message is associated with an instruction to initiate an instant messaging session; and initiating an instant messaging session with the device associated with the incoming call based on determining that the instant response message is associated with the instruction to initiate the instant messaging session.

8. The method of claim 1, further comprising:

generating a callback score for the incoming call; and placing information regarding the incoming call on a ranked callback list based on the generated callback score, the ranked callback list including a ranked list of missed calls associated with the user device.

9. The method of claim 8, where the callback score is based on two or more of:

whether the incoming call is associated with the very important person contact;

whether the incoming call is marked as urgent;

an age associated with the incoming call, the age of the incoming call being based on a quantity of time that has elapsed between detecting the incoming call and generating the callback score;

whether the incoming call is associated with a calendar event; or a call history associated with a contact associated with the incoming call.

10. The method of claim 8, further comprising:

providing a reminder to a user, associated with the user device, at particular intervals, the reminder including the ranked callback list.

11. The method of claim 10, where the ranked list of missed calls includes at least one of:

an option for the user to call a number associated with the incoming call, an option for the user to schedule a reminder to call the number, or an option for the user to dismiss the call in the ranked list of missed calls.

12. A server device comprising:

a memory to store instructions; and a processor to execute the instructions to:

detect an incoming call intended for a user device, the user device being different from the server device;

determine whether the incoming call is associated with a contact, of a plurality of contacts associated with the user device, that has been identified as a very important person contact;

direct the incoming call to a voicemail system when the incoming call is not associated with the contact that has been identified as the very important person contact;

provide an instant response message to a device associated with the incoming call without sending the incoming call to the user device when the incoming call is associated with the contact that has been identified as the very important person contact;

determine, when the incoming call is associated with the contact that has been identified as the very important person contact, whether the instant response message is accepted by the contact; and direct the calling contact to the voicemail system when the incoming call is associated with the contact that has been identified as the very important person contact and when the instant response message is accepted by the contact.

13. The server device of claim 12, where the processor is further to:

select the instant response message, from a plurality of instant response messages, based on detecting a particular label associated with the incoming call.

14. The server device of claim 13, where the memory is further to:

store the plurality of instant response messages, and where, when selecting the instant response message, the processor is further to:

access the memory to obtain the instant response message.

15. The server device of claim 13, where, when selecting the instant response message, the processor is further to:

prompt a user, associated with the user device, to select the instant response message from the plurality of instant response messages; and receive, from the user, a selection of the instant response message.

16. The server device of claim 13, where the processor is further to:

determine that the instant response message is associated with an instruction to create a calendar event; and send an instruction to the user device to create the calendar event.

17. The server device of claim 13, where the processor is further to:
   determine that the instant response message is associated with an instruction to initiate an instant messaging session; and
   send an instruction to the user device to initiate the instant messaging session.

18. A non-transitory computer-readable medium storing instructions, the instructions comprising:
   one or more instructions which, when executed by one or more processors, cause the one or more processors to:
   detect an incoming call intended for a user device;
   determine whether the incoming call is associated with a contact included in a particular set of contacts;
   direct the incoming call to a voicemail system when the incoming call is not associated with the contact included in the particular set of contacts;
   provide an instant response message to a device associated with the incoming call, without a user associated with the user device answering the incoming call, when the incoming call is associated with the contact included in the particular set of contacts;
   determine, when the incoming call is associated with the contact included in the particular set of contacts, whether the instant response message is accepted by the contact; and
   direct the contact to the voicemail system when the incoming call is associated with the contact included in the particular set of contacts and when the instant response message is accepted by the contact.

19. The non-transitory computer-readable medium of claim 18, where the instructions further comprise:
   one or more instructions which, when executed by the one or more processors, cause the one or more processors to:
   determine a callback score for the incoming call based on one or more of:
      whether the incoming call is associated with the contact included in the particular set of contacts,
      whether the incoming call is marked as urgent,
      an age associated with the incoming call,
         the age of the incoming call being based on a quantity of time that elapsed between detecting the incoming call and generating the callback score,
      whether the incoming call is associated with a calendar event, or
      a call history associated with a contact associated with the incoming call;
   place information regarding the incoming call on a ranked callback list based on the callback score; and
   provide a reminder regarding the incoming call based on the ranked callback list.

20. The non-transitory computer-readable medium of claim 18, where the instructions further comprise at least one of:
   one or more instructions to provide an option for the user to call a number associated with the incoming call based on a list of missed calls,
   one or more instructions to provide an option for the user to schedule a reminder to call the number, or
   one or more instructions to provide an option for the user to dismiss the call in the list of missed calls.

* * * * *